United States Patent [19]

O'Daniel

[11] Patent Number: 5,333,500
[45] Date of Patent: Aug. 2, 1994

[54] METHOD OF BALANCING A TORQUE CONVERTER ASSEMBLY

[75] Inventor: Gregory F. O'Daniel, Farmington Hills, Mich.

[73] Assignee: General Motors Corporation, Detroit, Mich.

[21] Appl. No.: 23,494

[22] Filed: Feb. 26, 1993

[51] Int. Cl.$^5$ .............................................. G01M 1/16
[52] U.S. Cl. .................................... 73/468; 29/889.1; 29/889.5
[58] Field of Search ..................... 73/468, 469, 470; 29/888.021, 889.1, 889.5

[56] References Cited

U.S. PATENT DOCUMENTS 4,780,593 10/1988 Kato .................................. 73/469
5,201,116 4/1993 Kikuchi et al. ...................... 73/468

Primary Examiner—Donald Woodiel
Attorney, Agent, or Firm—Donald F. Scherer

[57] ABSTRACT

A torque converter has an end cover or input shell which is stamped from a sheet metal plate and has a stiffening fluid portion and an outer flow formed annular rim. The impeller, turbine and stator are assembled along with a torque converter clutch after which the rim portion of the end cover is welded to the impeller. The impeller and the cover have a flange or radially extending portion that is selectively trimmed to control the dynamic balance of the assembly. The turbine member is cast with the outer core and blade portions integral and an inner core member is welded thereto. This is completed prior to assembly within the torque converter.

1 Claim, 4 Drawing Sheets

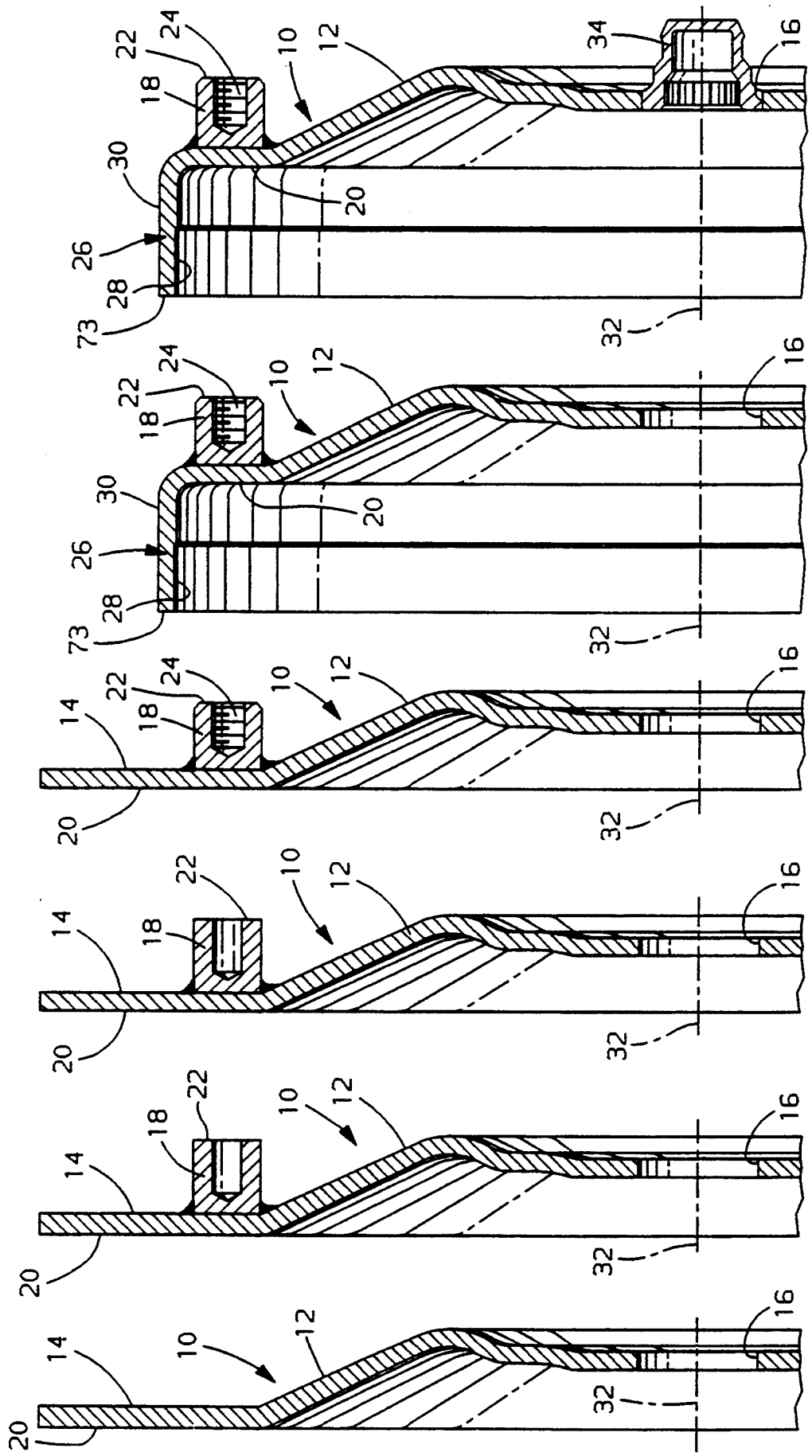

METHOD OF BALANCING A TORQUE CONVERTER ASSEMBLY

TECHNICAL FIELD

This invention relates to torque converters, and more particularly, to the manufacture of torque converters. Specifically, this invention relates to the balancing of a torque converter.

BACKGROUND OF THE INVENTION

Torque converter assemblies have an end cover which is welded to an impeller so as to close the torque converter assembly which is comprised of the impeller, a turbine and a stator disposed in toroidal flow relation, and a torque converter clutch which is disposed to frictionally engage the end cover.

The end covers of the known torque converters are formed by stamping a flat sheet metal component into an end cover shape wherein a central pilot is formed, a circulator strengthening rib area is formed, and the outer periphery is bent away from the pilot diameter to form an outer annular rim portion.

The lugs for connecting the torque converter to an engine are welded onto the stamping, after which the lugs and the stamping are machined on both sides. The dies for creating or manufacturing the stamping require high level investment as well as a very long lead time for replacement parts. Thus, the tooling costs for the torque converter cover are quite extensive.

The end cover is welded to the impeller or pump assembly to thereby form a pressure vessel for the torque converter. Currently, the cover is welded to the impeller by using either electron beam welding, mig welding or most recently, laser welding. Each of these welding processes has its own particular set of undesirable characteristics and all make use of a filler material in the form of welding wire which contributes to sediment within the transmission assembly. Mig welding is the slowest and least clean of the processes and adds a significant amount of process time and sediment. Electron beam welding requires high maintenance and capital investment welding equipment as does laser welding.

When the cover has been welded to the impeller, it is then necessary to provide for balancing the torque converter assembly. The three internal components, that is, the torque converter clutch, turbine and stator, are dynamically balanced prior to being assembled within the pressure vessel. After final assembly, however, it becomes necessary to again dynamically balance the entire torque converter assembly. The dynamic balance of the assembly is accomplished by fixing the internal components at one position and determining the imbalance by rotating the assembly on a conventional balancing machine.

The internal components, that is, the turbine clutch assembly and stator, are rotated 180 degrees and another balance measurement is taken. These readings are added vectorially to determine the true balance of the system and an appropriate weight is welded to the exterior of the cover. In theory, this yields a dynamically balanced torque converter assembly.

SUMMARY OF THE INVENTION

The present invention seeks to improve upon the manufacture and balancing of torque converters by providing a simplified manufacturing process for the end cover which is comprised of a simple blanking operation which forms the circular rib area, a circular outer edge and a pilot diameter. The lugs are welded to the outer surface at the proper location after which the inner and outer surfaces are machined flat. A flow forming machine is utilized to form the annular outer rim which is disposed for attachment to the torque converter impeller.

The pilot nose is welded to the cover after the spin forming operation. The reduces the cost and lead time of stamping dies, reduces the number of processing steps for the cover assembly, and increases the manufacturing flexibility and reduces the capital investment associated with the cover manufacture.

The torque converter assembly closure welding is provided by a process of resistance seam welding. In this process, the outer surface of the overlapping joint formed between the end cover and impeller is abutted by a wheel which applies pressure and conducts electrical current through the pieces to be welded. The weld is formed through the heat generated by the current and the pressure applied by the wheel. This weld is leak-free and requires no filler material to be utilized. Thus, a cleaner and more efficient welding process is provided.

This process has the advantage of operating at lower cost, has a lower capital investment and reduces the sediment level of the final torque converter assembly. This process will permit flexibility of the welder to processing of different size converters.

The closure weld is accomplished inboard of the outer edge of the overlapping member, be it the impeller or the cover. This leaves an annular portion which is outside of the pressure vessel and therefore can be removed. To balance the torque converter, the conventional spin balance procedure is followed to determine the amount of imbalance. After this is determined, the balancing is achieved by removing metal from the outer edge of the overlapping member. This eliminates the need to weld weights onto the converter thereby reducing assembly costs, and eliminates the possibility of further sediment being introduced into the system and also eliminates the problem of balance weights becoming detached during operation.

It is an object of this invention to provide an improved method of balancing a torque converter assembly.

It is another object of this invention to provide an improved method of assembling and balancing a torque converter, wherein a circumferential lip is provided during assembly which is thereafter selectively trimmed to balance the torque converter assembly.

These and other objects and advantages of the present invention will be more apparent from the following description and drawings.

DESCRIPTION OF THE DRAWINGS

FIGS. 1A through 1F show the resulting cover structures of the forming operations which are utilized.

DESCRIPTION OF AN EXEMPLARY EMBODIMENT

Figure 2A:
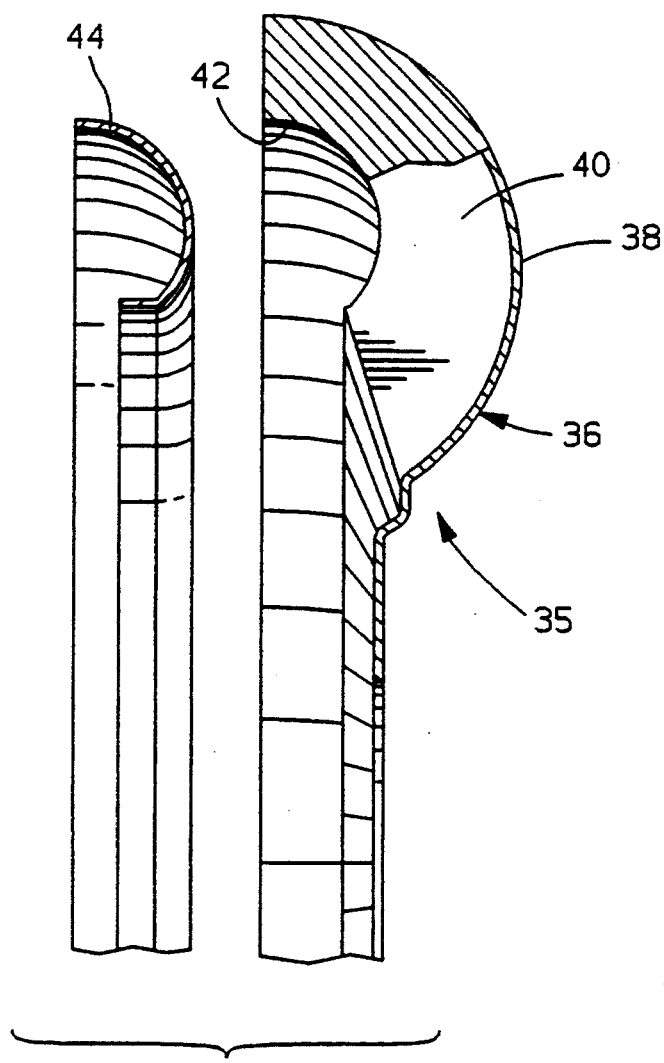
FIGS. 2A and 2B depict the assembly of the torque converter turbine.

FIG. 1A shows a torque converter end cover stamping 10 which has a dish or rib portion 12 which is stamped outwardly from a flat plate portion 14. A pilot opening 16 is formed in the end cover 10 by removal of metal.

Following the initial stamping step, the cover 10 has welded thereto a plurality of lugs 18, as seen in FIG. 1B. These lugs are welded at a position which will permit assembly with a conventional engine interface comprised of a flexplate, not shown.

In FIG. 1C, the end cover 10 is further prepared for assembly with a torque converter by providing a smooth finish on an inner surface 20 and by flat grinding the outer surface 22 of the lugs 18. The finished surface 20 will provide a frictional engagement surface for a torque converter clutch, as will be described later.

In FIG. 1D, the process is continued to provide a threaded opening 24 in the lug 18 which is utilized when connecting the torque converter to an engine.

In FIG. 1E, the process of manufacturing the torque converter end cover is continued by spin forming an outer annular portion or rim 26. In the spin forming or flow forming operation, as is well known, the inner surface at 28 is flow formed over a mandrel while the outer surface 30 is engaged by a plurality of rollers which move axially relative to the center axis 32 of the end cover 10. The use of flow forming permits a well defined inner shape having a smooth surface, such that further machining of this surface is not required prior to assembly.

FIG. 1F depicts the final step in the assembly of the end cover in which a pilot nose 34 is welded in the opening 16. The pilot nose 34 has a finished outer surface which will engage a bushing within the engine crankshaft thereby aligning the centerline 32 of the end cover and torque converter with an engine.

Figure 2B:
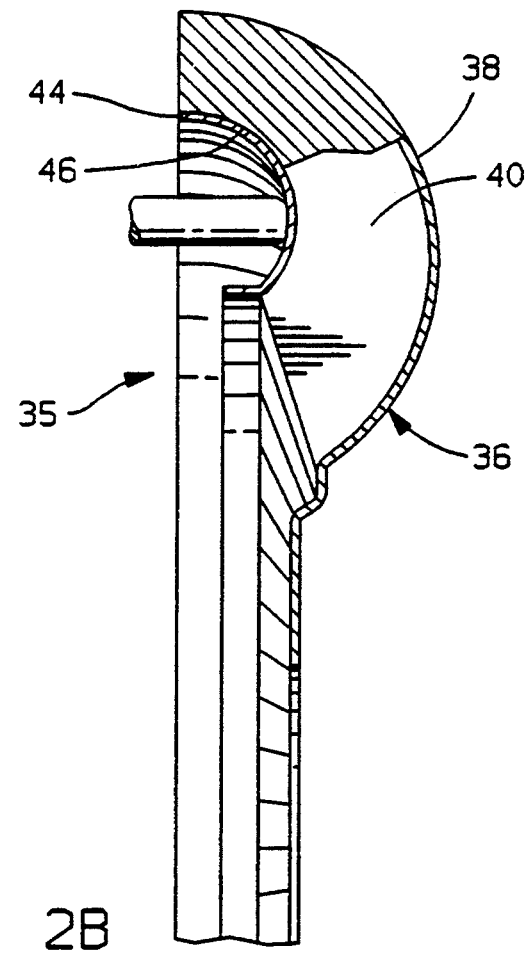

FIGS. 2A and 2B depict the assembly of the torque converter turbine 35. The turbine is comprised of two components. A bladed component 36 is cast with an integral outer shell 38 and a plurality of blades 40. The blades 40 have an inner semitoroidal curved surface 42 which is compliant with a semitoroidal inner core closure 44. The closure 44 is welded to the surface 42 of the blades 40 to complete the torque converter blade assembly. Prior to installation within a torque converter, the turbine blade assembly has secured thereto a hub 46 which has a splined inner diameter 48. The splined inner diameter 48, as seen in FIG. 3, is drivingly connected to the torque converter output shaft 50.

Figure 3:
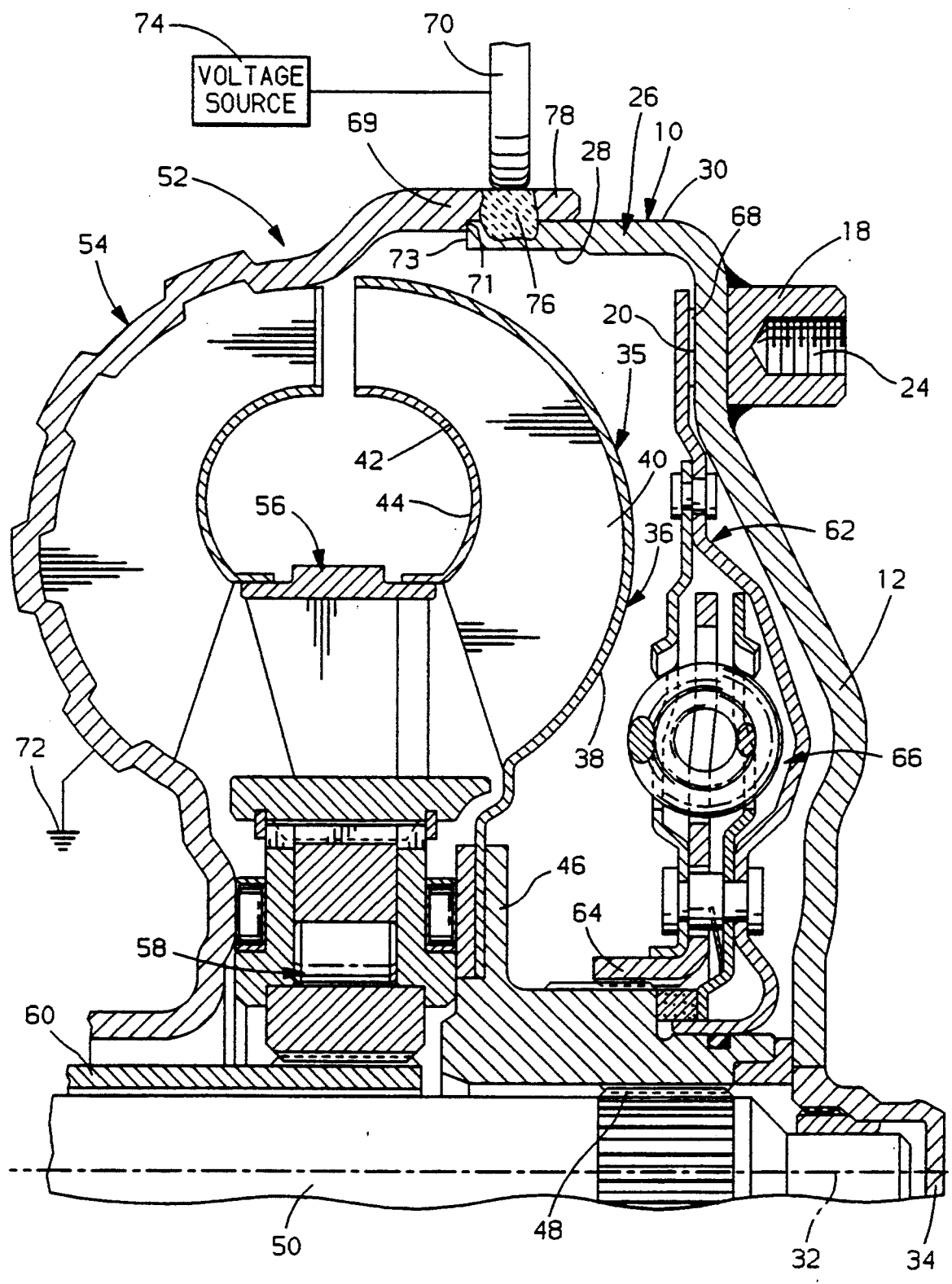
FIG. 3 is a cross-sectional elevational view of a torque converter assembly incorporating the present invention.

In FIG. 3, there is seen a torque converter assembly 52 comprised of the turbine assembly 35, an impeller assembly 54, a stator assembly 56, and a one-way brake assembly 58 drivingly connected with the stator 56. The one-way brake assembly 58 is connected to a stationary shaft 60 which, in turn, is connected to a transmission housing, not shown, in a well known manner.

The torque converter assembly also includes a torque converter clutch 62 which has an inner splined hub 64 drivingly connected to the hub 46 of the turbine assembly 35. The torque converter clutch assembly includes a conventional damper assembly 66 and a friction surface 68. The friction surface 68 is adapted to be engaged with the finished surface 20 of the cover 10.

To assemble the cover 10 to the impeller 54, the rim 26 of the cover 10 is inserted within an annular rim 69, which is a portion of the impeller 54. The rim 69 is welded to the rim 26 of the cover 10 by applying pressure through a roller member 70 while simultaneously permitting electrical current to flow from the roller 70 to a ground 72.

The roller 70 imposes a pressure on the juncture between the cover 10 and the impeller 54 which is heated by current flowing from a voltage source 74 attached to the roller 70 to the electrical ground 72 attached to the impeller 54. The combined pressure and heat thus provided at the juncture between the impeller 54 and cover 10 establishes a weld area 76 which unites the materials of the cover 10 and impeller 54 sufficiently to create a pressure vessel for the torque converter 52. The rim 69 has an end wall 71 which abuts an end face 73 of the rim 26. The weld portion 76 is disposed adjacent the abutment of the end wall 71 and end face 73. Thus, a closure is provided which is fluid tight.

The annular rim 69 of the impeller 54 has a annular lip portion 78 which extends outwardly from the weld portion 76. Thus, this material in the lip portion 78 is outside of the pressure vessel such that it can be utilized, as seen in FIGS. 4 and 5, to provide for balancing of the torque converter assembly.

Figure 4:
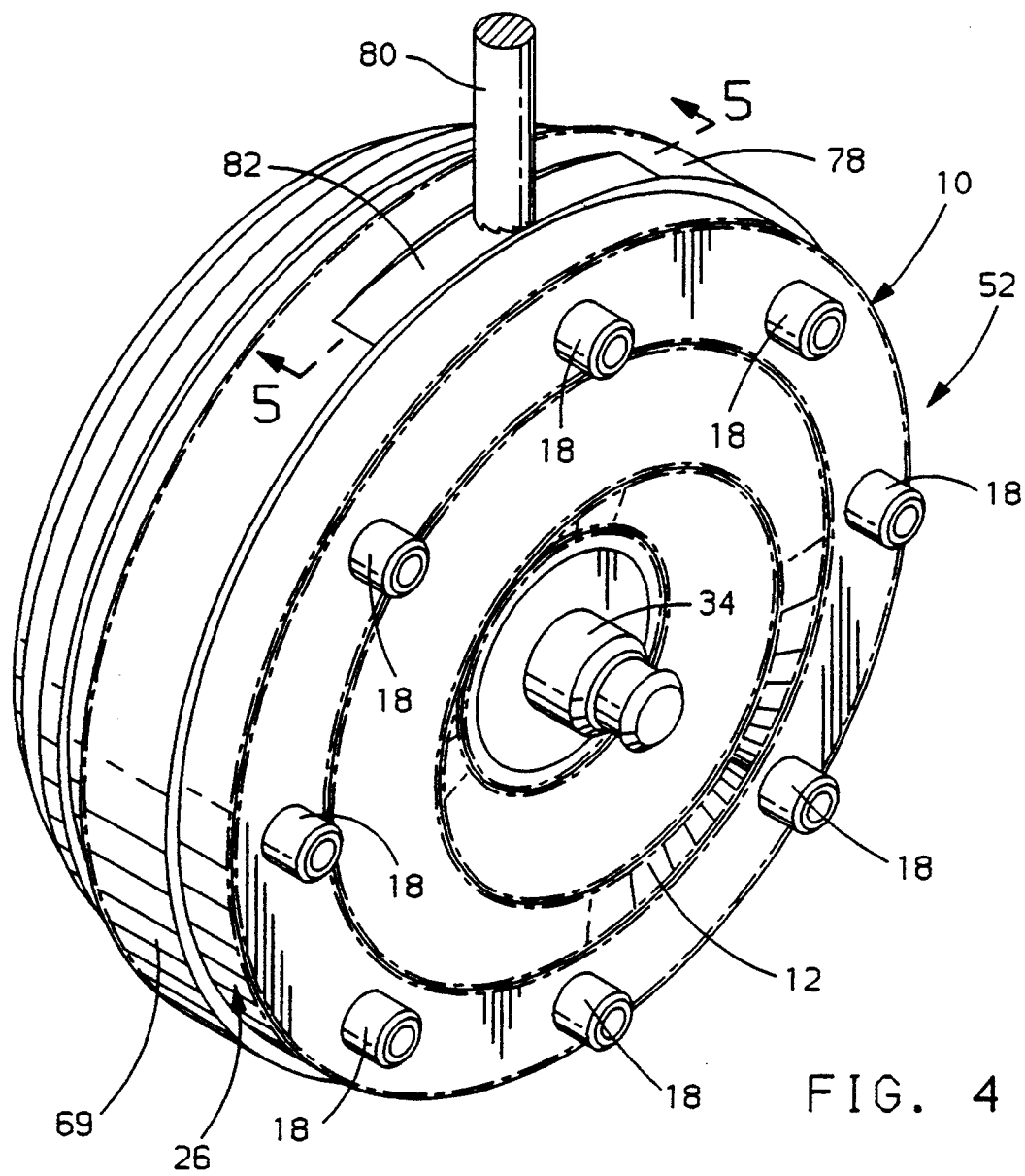
FIG. 4 is a perspective view of a torque converter assembly depicting the balancing operation.
Figure 5:
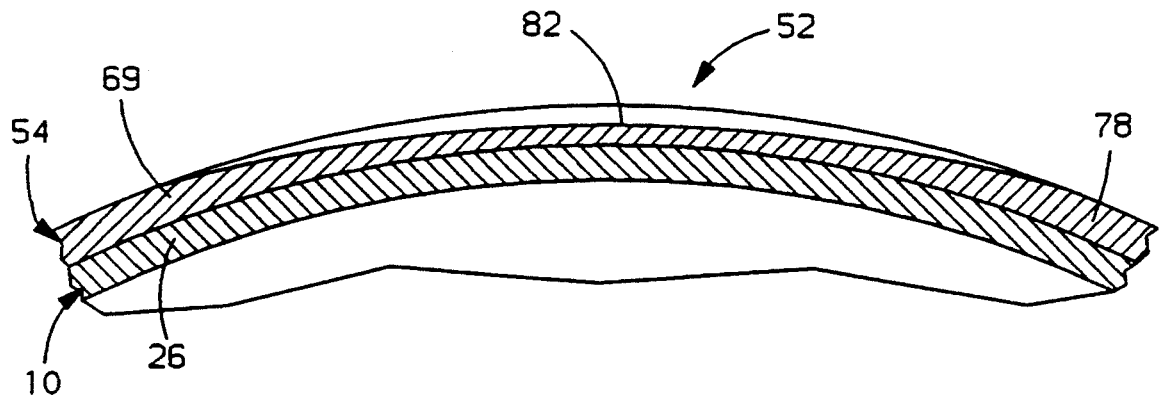
FIG. 5 is a view taken along line 5—5 of FIG. 4.

As seen in FIGS. 4 and 5, the lip portion 78 is engaged by a cutter 80, such as a mill cutter, to remove a portion of metal at 82 thereby permitting the dynamic balancing of the torque converter assembly 52. It should be appreciated that this provides a much cleaner and simpler structure for balancing than was provided by the prior art, wherein a piece of metal would be welded to the outer surface of the rim 69 of the cover 10.

The torque converter assembly 52 is shown in FIG. 3 with the annular rim 69 of the impeller 54 overlapping the outer surface of the rim 26 of the cover 10. However, this can be reversed, that is, the rim 26 can overlap the outer surface of the annular rim 69. In this assembly, the excess material to be removed during balancing would be taken from the end cover 10 rather from the impeller 54. Those skilled in the art will appreciate that it is of no significance which member overlaps during the assembly process.

The embodiments of the invention in which an exclusive property or privilege is claimed are defined as follows:

1. A method of balancing a torque converter assembly comprising the steps:
providing a torque converter assembly having an end cover welded to an impeller with the end cover having an axially extending annular wall disposed at a position outboard of the weld with respect to the end cover;
determining the balance condition of the torque converter assembly; and
removing a circumferentially extending segment of the annular end wall to perfect any imbalance condition in the torque converter assembly.

\* \* \* \* \*